April 6, 1965     J. BOLSEY     3,176,578
OPTICAL PROJECTION DEVICE
Filed Nov. 20, 1959     5 Sheets-Sheet 1

INVENTOR
Jacques BOLSEY by:
Michael S. Striker
Attorney

April 6, 1965  J. BOLSEY  3,176,578
OPTICAL PROJECTION DEVICE
Filed Nov. 20, 1959  5 Sheets-Sheet 2

INVENTOR
Jacques BOLSEY by: Michael S. Striker
Attorney

April 6, 1965
J. BOLSEY
3,176,578
OPTICAL PROJECTION DEVICE
Filed Nov. 20, 1959
5 Sheets-Sheet 3
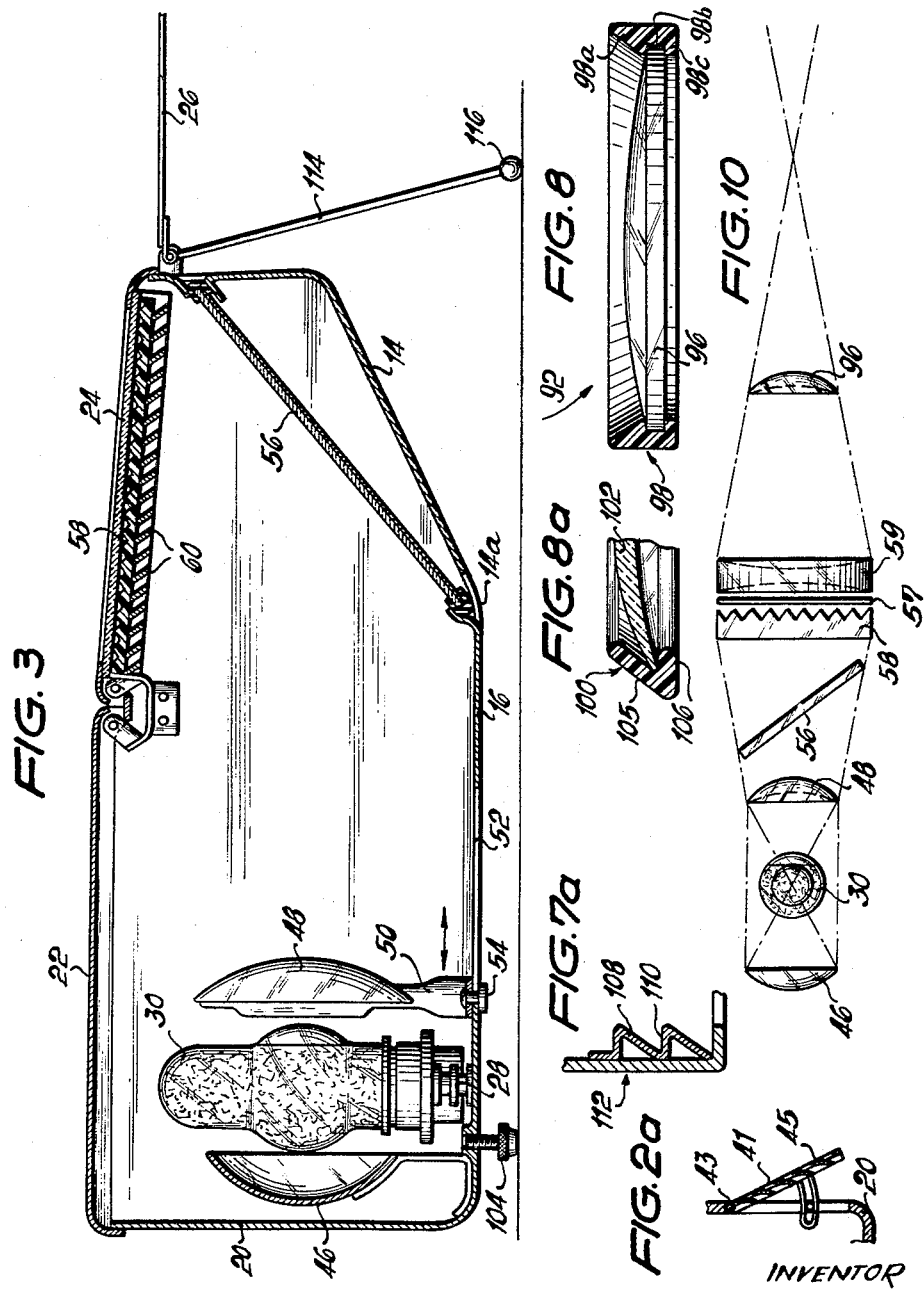
INVENTOR
Jacques BOLSEY

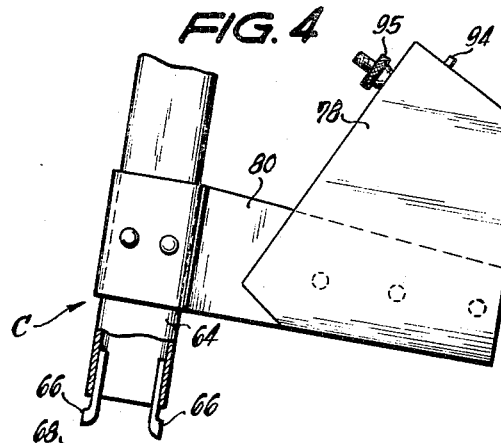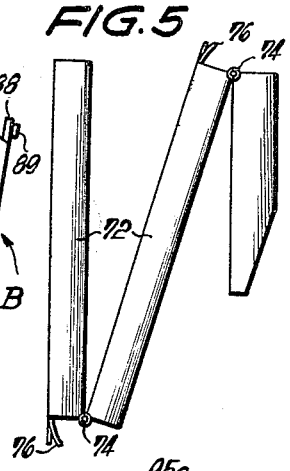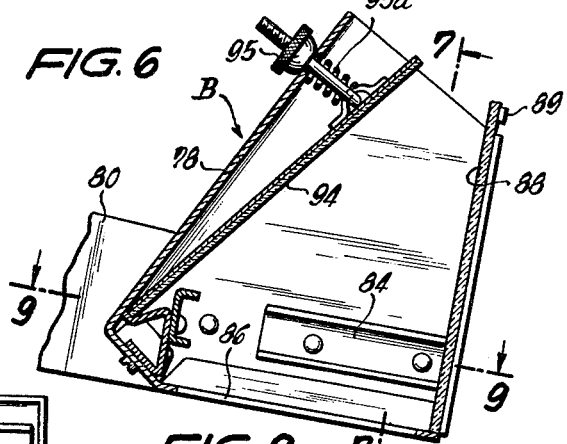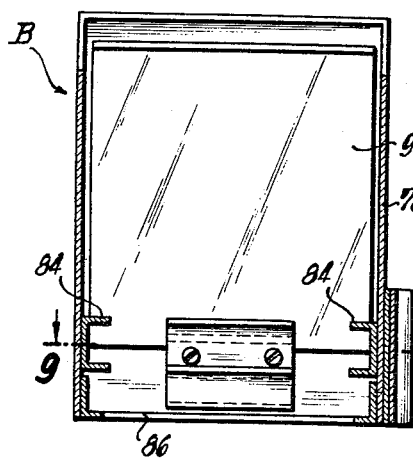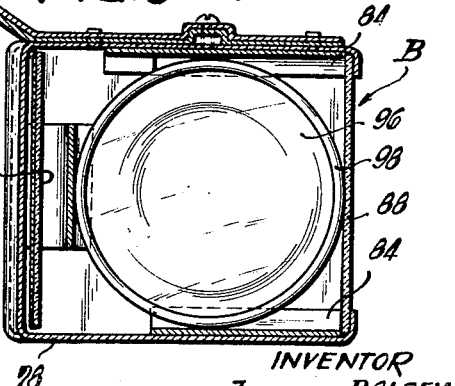

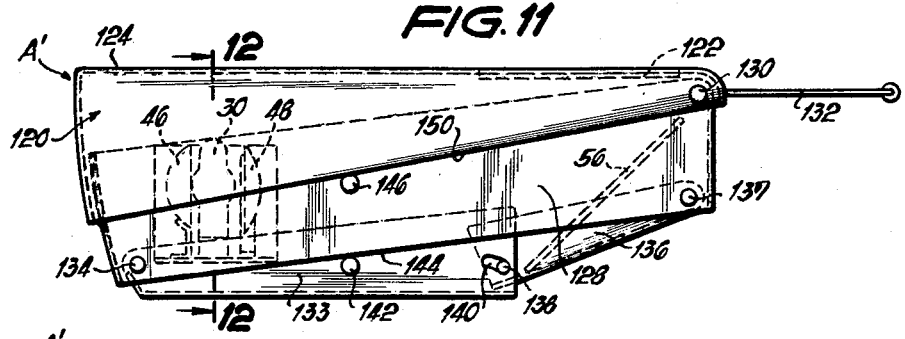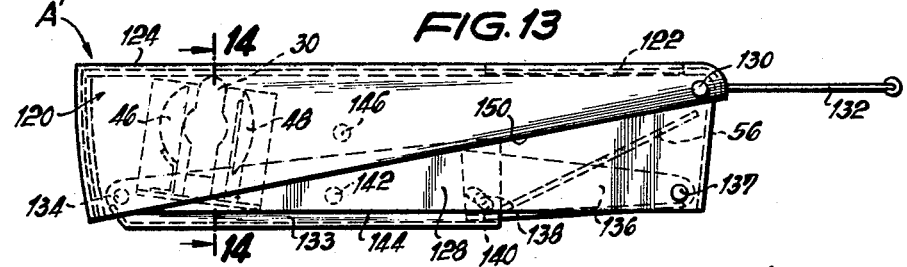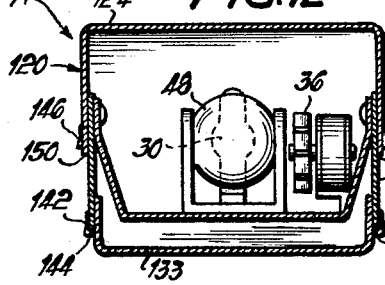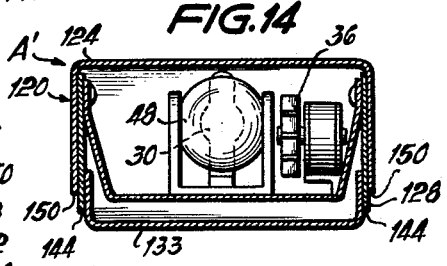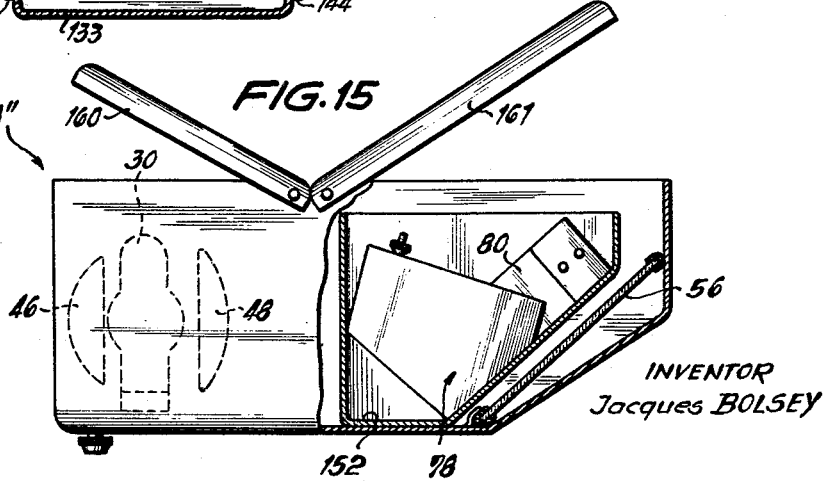
INVENTOR
Jacques BOLSEY 3,176,578
OPTICAL PROJECTION DEVICE
Jacques Bolsey, Hartsdale, N.Y.; Emil Bolsey, Maria Bolsey, and Norman W. Schur, executors of said Jacques Bolsey, deceased
Filed Nov. 20, 1959, Ser. No. 854,299
4 Claims. (Cl. 88—26)

This invention relates in general to optical projection equipment and in particular to a new and useful overhead type projection apparatus and system for employing the same.

Overhead type projection equipment has been known heretofore but such equipment generally includes optical portions which are mounted without adjustment within a large size single unit, the arrangements permitting a minimum amount of adjustment for changes in projection magnification and lighting, and the units being generally bulky and inaccessible. One disadvantage in the construction of such equipment is that the system requires a high power light source which tends to overheat despite the inclusion of a power consuming and noisy fan unit.

A further disadvantage in such systems is that the focusing and concentrating of light cannot be varied in accordance with projection requirements. Any objective lens system which is incorporated in the apparatus is standard and cannot be replaced without a complete remodification of the equipment. Such units are usually difficult to set up and aim in order to obtain the desired projection angle.

In accordance with the present invention there is provided an overhead projecting system which includes a condenser system including a fixed lens arranged beneath a slide or film supporting light transmitting member, and a movable condenser lens which may be shifted between the light source and the fixed condenser lens. The arrangement permits infinite variations in light direction and light-focusing control for projecting various sized images of a slide or film positioned on the substantially horizontal light transmitting plate which forms a table or desk on the top face of the housing therefor. The slide supporting light transmitting plate or table is substantially horizontal and completely open and accessible to an operator who may also demonstrate the images being projected by adding indicia directly onto the slide as they are being projected.

In accordance with a feature of the invention, the light source is mounted within the housing in a location to permit cooling air to be circulated by a small fan arranged to take air through an adjustable louvered intake at one side of the unit and direct the air across the housing, past the lamp, and through louvered openings on the opposite side of the housing. The cooling arrangement permits direct air flow and rapid dissipation of any heat caused by the operation of the lamp used for projection and the louvers permit substantially unhindered air passage but shield the light except in a small area adjacent the housing.

In accodrance with another feature of the invention, the lamp, or light source, the condenser system comprising at least one movable condenser lens and a fixed condenser lens (which advantageously may be an inexpensive Fresnel type lens), a slide supporting glass plate or table, and a reflector, are all contained within a substantially rectangular housing having a beveled or sloping forward face which permits the housing to be tilted in order to obtain the desired projection angle. The arrangement includes a folding or sectional mast member which adjustably suports an objective lens housing. The lens housing may be shifted along the height of the mast or the mast moved for precise focusing in accordance with the desired projection magnification and the focusing requirements for obtaining the desired image on a given area of screen located at a predetermined distance. The vertical alignment of the image which is projected may be adjusted by changing the elevation of the housing by either tilting the forward edge so that the beveled portion can be moved toward a supporting base or table as a set screw at the rear portion of the projector housing is elevated. In order to insure that the projection elevation is rigidly set at the correct projection elevation angle, there is provided a substantially U-shaped handle at the forward upper end of the housing which may be swung downwardly to bring an adjustable holding portion into contact with the supporting table and to lock the projector housing in the selected angle of tilt. In this position, the projector is supported by the elevating screw at the rear, by the bottom edge of the beveled portion and by the locking arm at the forward end of the housing.

A further feature of the invention is the use of an improved objective lens container and housing which may be adjustably positioned in the upstanding collapsible bracket. The bracket is designed to be inserted into the lamp and condenser housing and may include several portions which may be telescopically, foldably, sectionally or otherwise varied to provide a support at the desired elevation for the objective lens housing member. The projection head or the objective lens housing member is mounted on a bracket which extends outwardly from the mast and which may be adjustably positioned at substantially right angles to the slide on the supporting table.

The projector lens housing advantageously includes a receptacle for a plurality of substantially parallel projector lenses which are arranged in vertically spaced locations within the housing. In accordance with the invention, each objective lens is mounted within a substantially resilient annular member or collar. The bracket members within the projector lens housing include vertically spaced portions adapted to receive the lens which is advantageously mounted in an annular supporting member; such lenses can also be used without mounts. The arrangement is such that one, two or more objective lenses may be easily inserted or removed from the objective lens housing, in accordance with the magnification of the projected image.

The projector lens system advantageously includes a reflector or mirror which may be easily adjusted by means of a knurled collar and stud adjustment which extends outside of the housing. In some instances, it is desirable to include a combination of corrective and reflecting prisms within the projection system housing in order to compensate for any misalignment of the condenser and objective lens.

In accordance with the invention, there is also provided an improved system for utilizing projection equipment for instruction purposes. An operator-instructor would normally sit with his back facing the projected image on a screen at which latter location students would be assembled. The operator-instructor would place a slide or similar sheet bearing an image which would be projected on the screen and which would contain a problem for the student standing by the screen. In order to allow the teacher to follow the student, a retro-visor device is attached to the projector showing correctly the image on the screen. The operator would use a retro-visor device comprising two or more mirrors to see the student and the screen in an upright and right-side-right position while still facing the class but with his back to the screen. Indications of solutions to the problem may be made by the operator-instructor on the slide and these will be revealed on the screen. When so desired, the operator may change the magnification of the image to emphasize a particular detail. To do this it is merely necessary for him to insert or remove an objective lens in the objective housing in the device. If the student is required to complete the projected image, by writing on the screen, for example, the teacher will see it through the retro-visor device.

Accordingly it is an object of the invention to provide an improved overhead-projection apparatus.

The invention advantageously includes a bus bar-type fuse located in the donwstream side of the lamp to switch the lamp off if overheating occurs for any reason.

A further object of the invention is to provide an overhead projection apparatus including a housing having a fixed and a movable condenser lens or lenses arranged in spaced location from a light source and including a mast extension mounted on the housing and containing objective lenses arranged in the optical projection path of an image bearing media displayed on the top face of the housing.

A further object of the invention is to provide an overhead projection device including an objective lens housing adapted to be positioned on an upstanding mast supported in a housing and including means for adjusting the concentration and focus of a light source on the objective lens housing and wherein the objective lens housing includes accessible spaced objective lens supporting brackets therein.

A further object of the invention is to provide an objective lens housing of the character described which includes vertically spaced substantially parallel objective lens holding brackets defined within said housing, an opening in the front of said housing for access to said brackets and an adjustable reflector located within said housing for varying the direction of projection of the image.

A further object of the invention is to provide an improved mast construction for mounting an objective lens housing in an adjustable position above a lamp and condenser system.

A further object of the invention is to provide a projector lens mounting collar.

A further object of the invention is to provide an improved light source and condenser system including at least one condenser lens thereof which is slidable toward and away from the light source.

A further object of the invention is to provide a projector having direct cross ventilation for the projector lamp.

A further object of the invention is to provide a projector lamp of improved reflector construction.

A further object of the invention is to provide a projector housing including adjustable means for condensing and focusing from a light source therein and having a light transmitting desk-member for supporting an image bearing media for projection.

A further object is to provide a projector housing including a beveled forward face permitting the rear to be slanted and the forward face to be tilted downwardly toward its support and means to lock the housing at the desired projection angle.

A further object of the invention is to provide a cooling system for a projector lamp including a fuse system for shutting off the current through the lamp whenever a fan motor for circulating air thereover is inoperative.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 2a is a section taken along the line 2a—2a of FIG. 2;

FIG. 3 is a longitudinal section taken on the line 3—3 of FIG. 2;

FIG. 4 is a fragmentary side elevation of the objective lens housing and collapsible mast;

FIG. 5 is a side elevation on reduced scale of another embodiment of the collapsible mast;

FIG. 6 is a longitudinal section through the projector lens housing.

FIG. 7 is a vertical section taken on the line 7—7 of FIG. 6;

FIG. 7a is a fragmentary section similar to FIG. 7 of another embodiment of the objective lens housing;

FIG. 8 is a transverse section through an objective lens mounting collar constructed in accordance with the invention;

FIG. 8a is a section similar to FIG. 8 of another embodiment of collar for a concave lens;

FIG. 9 is a horizontal section taken on the line 9—9 of FIG 7;

FIG. 10 is a somewhat schematic optical system for the projector constructed in accordance with the invention;

FIG. 11 is a side elevation of another embodiment of combination condenser system housing and desk member;

FIG. 12 is a vertical section taken on the line 12—12 of FIG. 11;

FIG. 13 is a side view of the combination condenser system housing and desk member shown in a collapsed position;

FIG. 14 is a section taken on the line 14—14 of FIG. 13; and

FIG. 15 is a longitudinal section through another embodiment of combination condenser system housing and desk member indicating a construction in which the objective lens head may be stored within the front end of the housing.

Figure 1:
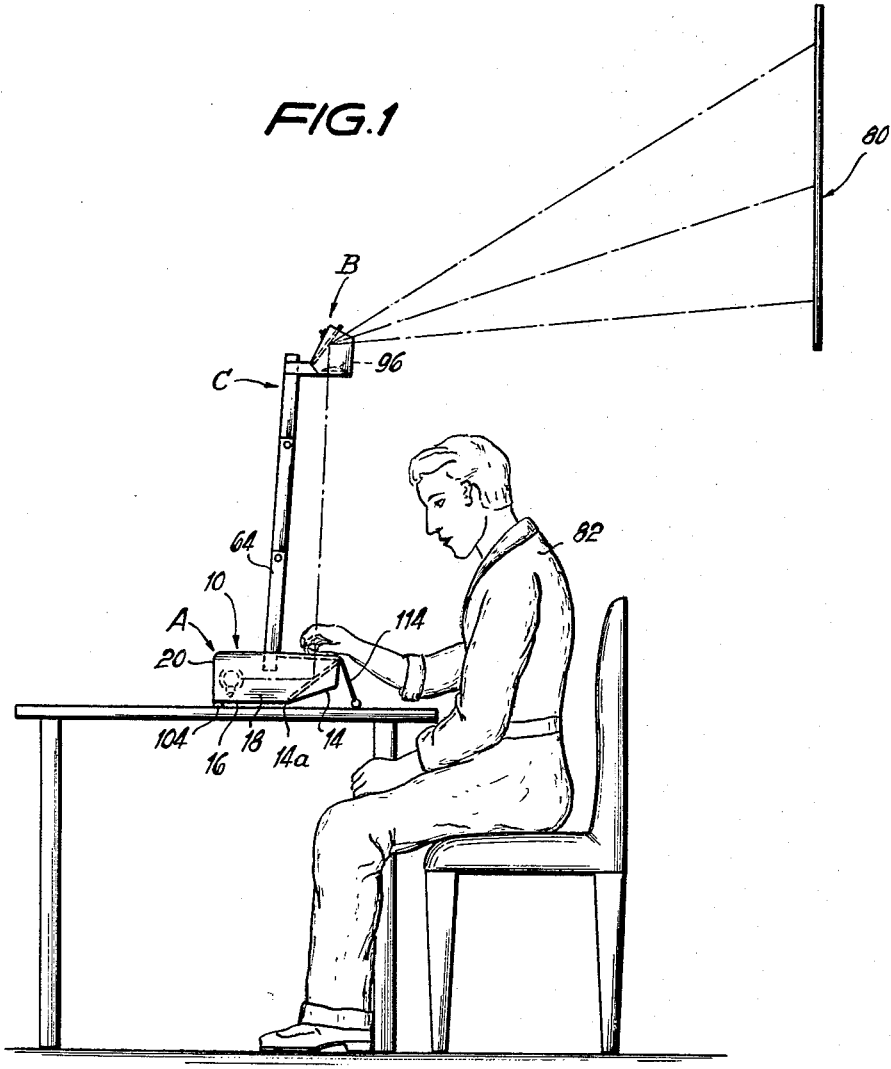
FIG. 1 is a side elevation of an improved overhead projection apparatus constructed in accordance with the invention and indicating an operator in position for operating the device.

Referring to the drawings in particular the invention as embodied therein includes an overhead projector system generally designated 10 which comprises a combination lamp and condenser system housing and desk generally designated A and an objective lens and mirror assembly generally designated B supported on a collapsible mast member generally designated C.

Figure 2:
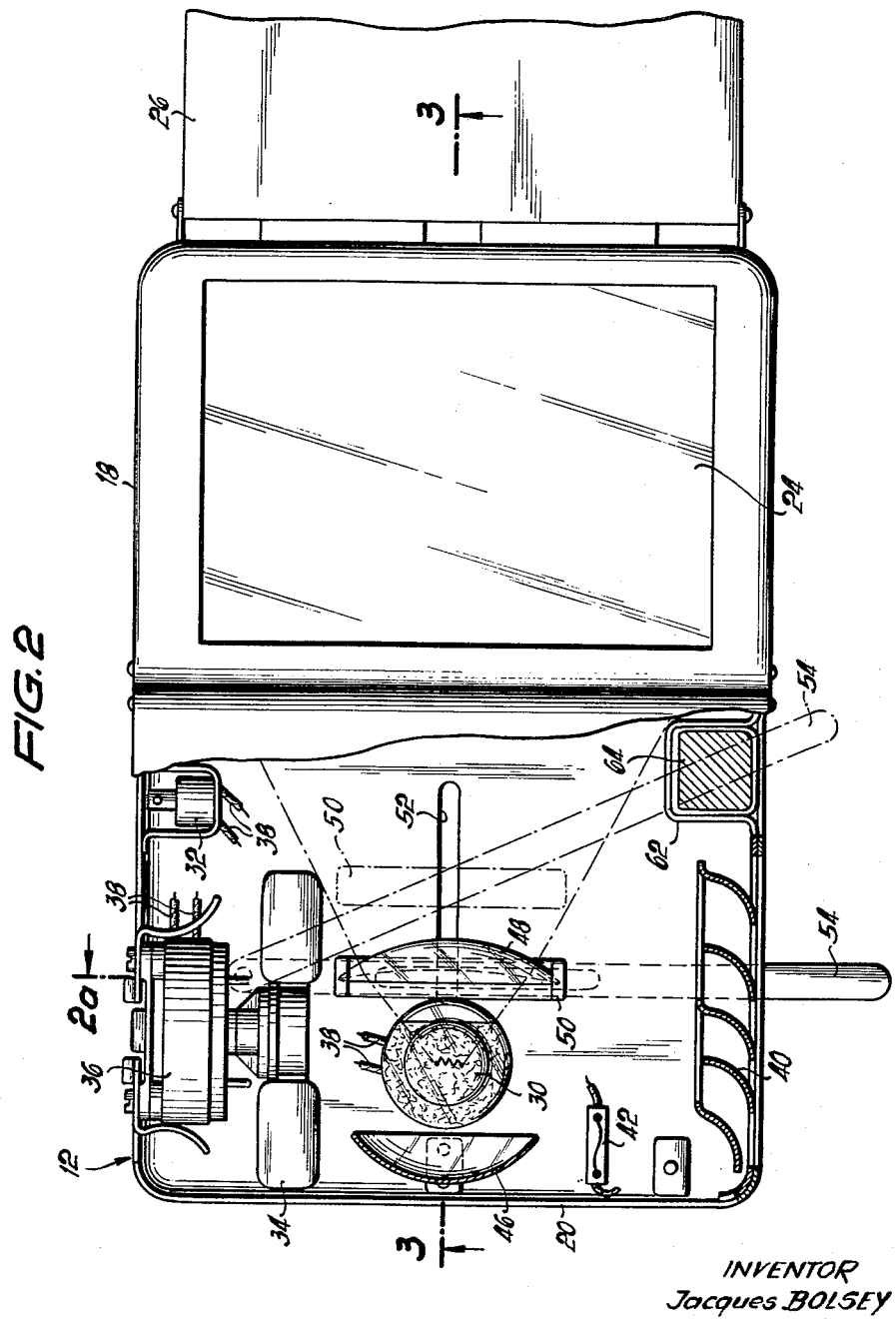
FIG. 2 is a top plan view partly broken away of the condenser system and lamp housing portion of the overhead projector constructed in accordance with the invention.

In accordance with the invention, the combination lamp and condenser system housing and desk A includes a substantially rectangular housing generally designated 12 having a sloping front wall 14 forming a rocking crest 14a, a substantially flat bottom wall 16, substantially vertical side and rear walls 18 and 20, and a top wall comprising a substantially horizontal rear cover portion 22 and a translucent combination writing desk and projection slide supporting table 24. Also pivotally mounted to the upper forward edge of the side wall 18 is a writing desk extension 26 which may be pivoted between a position in which it overlies the slide supporting table 24 or to a position as indicated in the drawing (FIGS. 2 and 3) extending outwardly therefrom.

On the interior of the housing 12 there is provided a mounting socket 28 for a projection lamp 30 which is adapted to receive power through internal wiring which connects to an outlet plug 32 defined in the housing. The lamp 30 is arranged directly in the middle of the housing at a spaced location from the fan 34 which is driven by a small motor 36 supplied with current from wiring 38 which is connected to the plug 32. Air is directed by the fan in the flow path indicated by the arrows in FIG. 2 directly across the housing and around the lamp and through adjustable louvers 40 on the opposite side of the housing. A fuse element 42 is located directly in the air stream coming from the lamp 30 and is connected in the portion of the wiring 43 which connects the lamp 30 so that the lamp is automatically shut off any time it overheats such as would be the case if the motor 36 is not running. The fuse element 42 is preferably of a bus-bar type or one which burns out upon overheating. Therefore, the element must be replaced after overheating, so that the person who operates the projecting system will correct any irregularity before he replaces the fuse element.

One of the side walls 18 advantageously includes a pivotal wall portion 41 hingedly at the upper end on a pivot 43 (FIG. 2a) to permit it to be swung outwardly to effect a greater flow area for cooling air. The portion 41 includes adjustable louvers 45.

In accordance with a feature of the present invention, the projector lamp 30 is advantageously of the type indicated in FIG. 3 in which a major portion thereof is coated with reflective material or silvered as at 44 in order to approximate an integral sphere and enhance the light beam output produced by the lamp. Thus all rays of light are reflected interiorly of the lamp and the light which is emitted thereby is highly increased.

If a lamp of the type shown in FIG. 3 is not used, then a reflector member 46 is mounted behind the lamp in order to direct light outwardly therefrom in useful direction. The light directed is passed through a first condenser lens 48 affixed to a movable carriage 50 which is guided in a slot 52 for movement toward and away from the lamp 30 under the control of a lever control arm 54. The lamp may be advantageously made adjustable in the same manner as the condenser lens 48. Light directed through the lens 48 is reflected by a mirror 56 upwardly through a stationary lens 58 of the condenser system. By using a Fresnel-type lens it is possible to further improve the light output by properly correcting the lens for the marginal rays.

By making one of the lenses of the condenser system adjustable, such as the lens 48, it is possible to use as objectives very inexpensive lenses such as the ordinary meniscus lenses. The lens 58 is advantageously a Fresnel-type lens having a short focal length and advantageously made of an inexpensive plastic material. This adjustable optical system is very inexpensive and permits high concentration of the light from the lamp 30 and adjustment of the location of its concentration for projection of the image of a slide member which is placed on the combination writing desk and projection slide supporting table 24.

A preferred optical system is indicated in FIG. 10 in which light is either reflected by the reflector 56 or directly passed to the flat or Fresnel-type lens 58. Light passing through the fresnel 58 falls on the transparency 57. The image light is corrected for spherical aberration by a lens 59 which may be used if desired. Image light rays are then directed through one or more objective lenses 96 for magnification and projection on a screen.

Transparencies to be projected, such as images on clear plastic sheets, are placed on the glass table 24. The operator is shielded against direct light by louvers 60 located below the lens 58 and which prevents the rays of direct light from going upwardly into the operator's eyes.

Light which is concentrated at the glass top 24 at the location of the slide is directed through an objective lens system located in the objective lens and mirror assembly B which is adjustably positioned on the mast C. The mast C is supported within a rectangular holder or bracket 62 which is located adjacent the side wall 18 and opens through the top wall 22. The mast C includes a lower portion having rack teeth 61 engageable with a worm wheel 63 affixed to a shaft 65 which is rotatably mounted in a side wall 18. The worm 63 is rotated by a knob 67 to raise or lower the mast C for fine adjustment.

The mast C comprises a series of bar sections 64 assembled together to achieve the desired height for supporting the assembly B. For this purpose, the mast portions 64 advantageously include spring hook members 66 which extend outwardly from one end. The springs may be biased inwardly and inserted into an associated opposite end portion of another mast member 68. When in this position the spring portions 66 are released and they engage holes 70 of the opposite mast member 64 (see FIG. 4).

An alternate embodiment of the mast shown in FIG. 5 includes several sectional portions 72 hingedly connected by open hinges 74. The individual sections 72 are hooked into a rigid position against the biasing of a resilient portion 76 which extends upwardly from each section 72. Thus, this mast may be assembled to the desired height by folding the sections outwardly, or it may be folded flat for storage within a suitable casing along within the combination lamp and condensing system housing A.

In accordance with the invention, a projector lens and mirror assembly B comprises a substantially rectangular housing generally designated 78, the rear end of which is mounted on an arm 80 which may be adjustably positioned on the mast 64. Suitable lock screw means are provided to lock the arm 80 in its desired elevation to bring the objective lens assembly B into vertical alignment with the light concentrated on the slide by the condenser system and to focus the image of the slide for projection on a screen generally designated 80a, which is arranged at a spaced location from the overhead projector and in back of an operator 82.

In accordance with the invention, the interior of the housing is provided with a plurality of channel-shaped projector lens supporting brackets 84 spaced vertically upwardly from an opening 86 located in the bottom of the housing 78. The housing includes a front window 88 which may be raised by an external flange portion 89. The window 88 is raised to introduce or interchange the lenses 96, which are also held in proper position by the same window 88.

Light directed upwardly through the image bearing transparency placed on the desk 24 is directed onto the screen 80a through an adjustable mirror 94. The mirror 94 may be adjusted angularly by a set screw 95. A spring 96a biases the mirror downwardly, therefore movement of the screw 95 adjusts the inclination of the mirror 94.

In accordance with another feature of the invention, the objective lens assembly 92 includes an objective lens 96 inserted in an annular holder 98. The holder 98 is preferably made of a resilient material, such as rubber or plastic, and includes an internal diameter upper portion 98a, an intermediate internal portion of smaller diameter 98b and a lower internal portion 98c of the same diameter as the upper portion 98a. The lens 96 is inserted by inserting an edge of the lens over the portion 98b and then deforming the holder to permit insertion of the opposite edge over the portion 98c.

When the front end of the housing 78 is open the operator 82 may insert one or more of the objective lens assemblies 92 into the brackets 84 at any one of the plurality of vertically spaced locations. Thus, it is possible to place one, two, or more objective lenses into the housing B in order to achieve the desired magnification of image on the screen 80a. Then the entire assembly B may be moved upwardly or downwardly on the supporting mast C for image focusing.

In FIG. 8a another embodiment of mount 100 is provided for a concave objective lens 102. The mount includes angled sides 104 and 106 which may be wedged between similarly angled sides 108 and 110 of another embodiment of objective lens housing bracket 112 (FIG. 7a).

A further feature of the invention is the inclusion of a combination carrying handle and projection-elevation adjustment holder generally designated 114. This member comprises a substantially U-shaped bracket having a non-skid portion 116 at the bottom which may be wedged against a table surface to hold this end of the projector housing steady. The opposite end of the housing advantageously includes a thread screw adjustment generally designated 104 which includes a nut which may be rotated with the screw to raise or lower this end. Thus, once the screw and nut assembly have been rotated to elevate this end of the housing to the desired elevation for projecting the image, the entire assembly may be locked in position by merely deflecting the handle member 114 downwardly against the table.

When a mast C is removed from the housing A and the extension 26 positioned over the table 24, for its protection the housing may be carried by use of the same handle member 14.

Thus, the invention provides an extremely versatile type of projector in which images on slides or other transparent media may be projected onto a screen. Since the operator has free access to the combination writing desk and projecting slide supporting table 24, he may make notations on the slide for demonstration purposes and may easily change and reposition slides. The apparatus includes an auxiliary writing desk 26 to permit the operator to make additional notes if desired.

The operator, in a position facing the projecting unit, may guide the conduct of students working in the vicinity of the projection screen by making direct notations on the image bearing media. If desired, he may vary the size of the image by replacing one of the objective lens mounts 92 or inserting an additional objective lens along therewith. The instructor-operator may write in the usual manner directly on the slide and this will be projected in the correct orientation for reading on the screen.

The mirrors or other suitable means such as a retro-visor D (FIG. 1) may also be used to enable the instructor to keep his eye on the students by the screen, if desired. The adjustable condensing system effects an efficient utilization of light with uniform light distribution on the screen. As a result, the arrangement permits the use of a lower wattage lamp and maintenance of highly efficient projection.

Since the lamp is located in the direct path of cooling air flow which travels across the casing, there is increased life expectancy for the lamp and for the projector system.

In the embodiment illustrated in FIGS. 11 to 14 a combination condenser system housing and desk member A' is made of a collapsible construction which permits the bottom and end walls to be folded upwardly and the cover member to be folded downwardly to present a substantially rectangular outline. The folded housing may be easily carried by hand using the combination housing lock and handle member 114.

In this embodiment the combination condenser system housing and desk member A' includes a top cover portion generally designated 120 which includes a combination projection table and desk member 122 which is defined on the front part of the top face and an access opening member 124 which forms the rear portion of the top face. The top cover member 120 is substantially triangular in side elevation and it telescopes over a substantially rectangular central body portion 128. The cover 120 is pivotally connected to the body portion 128 at the forward end thereof at the location of a pivot 130. A combination carrying handle and locking member 132 is also pivoted to the cover member at this location. A base member 133 which is triangularly shaped in side elevation, is hingedly connected as at 134 to the rear end of the body member 128. A forward base portion 136 is hingedly connected at its forward end to the body portion 128 and is pinned to the rear base portion 132 by a pin 138. The pin 138 extends inwardly and is confined within a slot 140 formed on rear base portion 133. The central portion 128 supports a lamp motor, and condenser system 139 which is mounted on the bottom of member 128 so it may be telescoped within the rectangular portion 128 as indicated in FIG. 13. The forward base portion 136 is similarly pivoted on its pivot 137 when this is done.

When the cover portion 120 is telescoped downwardly over the rectangular body portion 128, the entire combination condenser housing and desk member assumes a substantially rectangular outline in side elevation as indicated in FIG. 13.

In order to hold the base members 132 and 136 in an open position, there are provided knob members 140, 142 on each side of the member 133 which includes telescopic portions which are biased outwardly and fit beneath a bottom edge 144 of the body member 128 to hold the parts in an extended position. Similarly, knobs 146 and 148 include telescopic portions, the outer one of which is biased outwardly beneath an edge 150 of the cover portion when the latter is moved to an open position to permit the knob portions 146 and 148 to spring outwardly. In order to collapse the housing it is merely necessary to press the knobs inwardly and collapse the portions as the knobs are pressed beneath the edges 150 and 144.

In the embodiment illustrated in FIG. 15, there is provided a combination condenser system housing and desk member A'' which is somewhat similar to the other embodiments but includes a removable holding bracket 152 which is defined on the inner walls thereof to accommodate the objective lens head 78 along with its supporting bracket 80. The mast member may also be placed within the housing so that the complete projector system may be carried within a single housing. The cover members 160 and 161 may be raised as indicated to permit access to the individual ends or the whole top may be lifted if desired.

If desired, the device may be used as a camera or as a copier in which case a hood would be placed over the whole projector, including the objective lens assembly, except in the area of the objective and openings for the eyes and hands. The lamp within the housing would then be switched off and a subject (the subject to be reproduced), would be properly illuminated and placed in front of the assembly B, such as at the screen 80. The operator 82 would then be able to trace the subject on paper placed on the desk 24 within the hood at a location beneath the objective lens assembly B. By varying the distance to the object or the lens in the assembly B, the operator can vary the size of the object projected.

By replacing the paper sheet by a photographic paper or film, and by protecting it from unwarranted ambient light, one can produce photographs of a variety of subjects.

While a specific embodiment of the invention has been shown and described in detail to illustrate the application of the invention principles, it will be understood that the invention may be embodied otherwise without departing from such principles.

What is claimed is:

1. In an optical projection device, in combination, optical means including an objective and a condenser lens located along the optical axis of said optical means; means supporting said condenser lens for movement along said optical axis so that the position of said condenser lens in said optical means can be adjusted; and means supporting said objective for removal and replacement by an objective of a different focal length, whereby the position of said condenser lens along said optical axis may be adjusted in accordance with the focal length of the particular objective which is included in said optical means, said means for removably mounting said objective including a pair of channel members receiving a pair of diametrically opposed edge portions of said objective.

2. In an optical projection device, in combination, optical means including an objective and a condenser lens located along the optical axis of said optical means; means supporting said condenser lens for movement along said optical axis so that the position of said condenser lens in said optical means can be adjusted; and means supporting said objective for removal and replacement by an objective of a different focal length, whereby the position of said condenser lens along said optical axis may be adjusted in accordance with the focal length of the particular objective which is included in said optical means, said means for removably mounting said objective including a pair of channel members receiving a pair of diametrically opposed edge portions of said objective and a transparent plate extending across said channel members adjacent an end thereof and retaining said objective in said channels, said plate being removable to release said objective for movement out of said channels so that another objective may be located in said channels, said optical means including a reflector for reflecting through said transparent plate light which passes through said objective.

3. In an optical projection device, in combination, an objective housing having a removable transparent front wall; a pair of objective-carrying channels carried by said housing and extending substantially perpendicularly with respect to and terminating adjacent said front wall; an objective removably mounted in said channels and retained therein by said front wall, so that upon removal of said front wall the objective can be removed from said channels and exchanged for an objective of a different focal length; a condenser lens system located along the optical axis of said objective; and means supporting one of the condenser lenses of said condenser lens system for adjustable movement along the optical axis so that the condenser lens system can be adjusted to the focal length of the objective which is located in said housing.

4. An overhead projection device comprising, in combination, a lower unit having front and rear ends and including adjacent said rear end a lamp and adjacent said front end a condenser lens located in a substantially horizontal plane during use of the device, said unit including a reflector beneath said condenser lens for reflecting light from said lamp through said condenser lens and a second condenser lens between said lamp and reflector as well as a means for adjusting the position of said second condenser lens along the optical axis; a mast extending upwardly from said lower unit; an upper unit carried by said mast and including an objective receiving the light which is drected upwardly through said condenser lens in said substantially horizontal plane and a reflector for directing an image from said objective to a screen; and a pair of parallel supporting channels forming part of said upper unit and receiving diametrically opposed portions of said objective for removably mounting said objective therein so that one objective may be exchanged for another objective of a different focal length, whereby the adjustability of said second condenser lens along said optical axis adapts the condenser lenses to the focal length of the particular objective which is in said upper unit.

References Cited in the file of this patent

UNITED STATES PATENTS

| | | |
|---|---|---|
| 1,319,820 | Williams | Oct. 28, 1919 |
| 1,333,303 | Gage | Mar. 9, 1920 |
| 1,545,674 | MacKay | July 14, 1925 |
| 1,761,361 | Oberg et al. | June 3, 1930 |
| 1,914,762 | Thomas | June 20, 1933 |
| 2,078,586 | Richter | Apr. 27, 1937 |
| 2,141,317 | Sabel | Dec. 27, 1938 |
| 2,258,014 | Kallusch | Oct. 7, 1941 |
| 2,285,915 | Dutton | June 9, 1942 |
| 2,344,263 | Perkins | Mar. 14, 1944 |
| 2,518,671 | Eagle | Aug. 15, 1950 |
| 2,573,088 | Zillmer | Oct. 30, 1951 |
| 2,586,436 | Planer | Feb. 19, 1952 |
| 2,600,975 | Critoph | June 17, 1952 |
| 2,679,784 | Simmon | June 1, 1954 |
| 2,699,704 | Fitzgerald | Jan. 18, 1955 |
| 2,767,611 | Fitzgerald | Oct. 23, 1956 |
| 2,859,660 | Lucas | Nov. 11, 1958 |
| 2,863,356 | Goldberg | Dec. 9, 1958 |
| 3,031,922 | Stadler | May 1, 1962 |

FOREIGN PATENTS

| | | |
|---|---|---|
| 642,939 | Great Britain | Sept. 13, 1950 |